Nov. 17, 1925.

G. HORNER

ENGRAVING MACHINE

Filed June 23, 1924     7 Sheets-Sheet 3

Inventor
George Horner
Hubert Peck
Attorney

Patented Nov. 17, 1925.

1,562,237

UNITED STATES PATENT OFFICE.

GEORGE HORNER, OF RACINE, WISCONSIN, ASSIGNOR TO GEORGE GORTON MACHINE COMPANY, OF RACINE, WISCONSIN, A CORPORATION OF NEW JERSEY.

ENGRAVING MACHINE.

Application filed June 23, 1924. Serial No. 721,874.

*To all whom it may concern:*

Be it known that I, GEORGE HORNER, a citizen of the United States of America, and resident of Racine, county of Racine, State of Wisconsin, have invented certain new and useful Improvements in and Relating to Engraving Machines, of which the following is a specification.

This invention involves improvements in and relating more particularly to so-called engraving machines and the like; and the objects and nature of the invention will be readily understood by those skilled in the art in the light of the following explanations of the accompanying drawings that illustrate what I now believe to be the preferred mechanical expressions or embodiments of my invention from among other forms, constructions and arrangements within the spirit and scope of my invention.

An object of the invention is to provide improvements in the mounting and control of the cutter heads of milling machines and the like, such as so-called engraving machines, wherein the cutter head is moved over the work by a so-called tracer, in following a pattern, through the medium of any suitable pantograph arrangement or the like, with the ends in view, among others, of enabling the milling tool or cutter to reproduce the pattern on work having a curved or spherical surface; of automatically maintaining uniform tension of the cutter driving band or bands whatever the position of the cutter head as it is moved over the work by the pantograph; and of improving the cutter head assembly.

A further object of the invention is to provide improvements in the constructions and arrangements of parts with the end in view of producing a highly advantageous and efficient engraving machine and the like.

With the foregoing and other objects in view, my invention consists in certain novel features in construction and in arrangements and in combinations, as more fully and particularly set forth and specified hereinafter.

Referring to the accompanying drawings.

In the drawings, a so-called engraving, or a milling machine, of the pantograph type is illustrated without desiring to so limit all features of the invention.

In the particular embodiment illustrated, a frame or column 1, is provided that carries, in any suitable manner, a pattern or templet table 2 that is constructed and arranged to receive the master design, pattern or templet to be duplicated, and to have said pattern fixed thereto. The pattern is fixed on the pattern table in such manner, that the tracer 3, carried by the pantograph, can be freely moved over the pattern, as will be understood by those skilled in the art, to correspondingly move the cutter, usually consisting of a rotary milling tool 4ª carried by the chuck 4, through the medium of the pantograph. The frame or column 1, also carries through the medium of any suitable mechanism or supports, any suitable work table or slide 5, which is adapted to receive and have the work to be milled or engraved, fixed thereon. The work table 5 is, in the example illustrated, arranged below the cutter head that carries the cutter held by chuck 4, so that the pantograph can move the cutter over and in operative relation to the work on said work table as the tracer follows the pattern on table 2.

Any suitable type or construction of pantograph, or mechanism for transmitting the rotary cutter shifting or controlling movement from the tracer following the master or pattern to the cutter, can be employed, although in the particular embodiment illustrated I more or less diagrammatically illustrate any suitable jointed link or arm parallelogram form of pantograph mechanism 7, supported or suspended from the frame or column by vertical supporting pivot 8. One link or rod of this pantograph is extended at 7$^a$ and provides an operating handle and holder for the vertical tracing stylus or tracer 3.

The front angle portion or link of the pantograph 7 diagonally opposite the tracer 3, is operatively coupled to the vertical cutter head located over the work table 5, to impart movements thereto corresponding to the movements of the tracer. In the particular embodiment that I happen to illustrate, the cutter head is carried by the pantograph parallelogram or jointed links, although I do not wish to so limit my invention which can be utilized in other well known forms of pantograph mechanisms, wherein the cutter is not directly carried by the pantograph parallelogram.

In the embodiment shown, a horizontal cutter head arm or carrier 7$^b$ is normally fixed to a side link of the parallelogram and projects forwardly from the pantograph parallelogram and hence forms a forward projection from such pantograph. The front end of this arm or carrier 7$^b$, forms the vertical hollow boss, housing or head 7$^c$ of the cutter head. The slide carrying the rotary cutter spindle is mounted and vertically movable in this head 7$^c$, and if so desired, the lower end portion of the head 7$^c$, can be longitudinally split to provide a split clamp that can be tightened and loosened by clamp screw 9 to lock the slide after adjustment and to release the same for vertical sliding movement in the head, and in fact, therefrom. The slide embodies a vertical sleeve 10 through which the rotary cutter spindle 11 longitudinally and centrally extends, in which it is mounted and by which it is carried. The lower end of the spindle depends from the sleeve and is equipped with any suitable means, such as chuck 4, to receive and hold any suitable rotary milling or other cutter 4$^a$ required to perform the desired engraving or cutting functions on or in the work on the table 5.

Within this sleeve, any suitable radial and longitudinal thrust bearings are provided for the spindle 11. For instance, I show several series of annular ball bearings 12, within the sleeve and surrounding intermediate portions of the spindle length. The lower end portion of the spindle is formed or provided with an enlarged annular flange or disk 13 rigid therewith that rotates between and in contact with a ring 14 held against upward movement within the sleeve 10 by internal shoulder 10$^a$, to limit relative upward end play movement of the spindle, and a ring nut 15 to limit relative downward end play movement of the spindle. In other words, the sleeve is provided with any suitable means (and I do not wish to limit all features of my invention to the ring 14 and ring nut 15) to cooperate with the spindle 11, as through the medium of the flange 13 to limit longitudinal movement of the spindle within the sleeve and to take up the thrust of the rotary milling cutter or tool when at work.

The lower end of the sleeve 10 is internally screw threaded to mesh with and receive the nut 15, which in this instance forms a bottom plug or closure for the sleeve 10 and around the lower end portion of the spindle. The nut 15 is shown formed with an annular groove in the wall of its bore by which any suitable packing 16 is retained to prevent lubricant leakage along the spindle and to exclude dust and the like. The various spindle bearings within the sleeve, are preferably so arranged as to permit flow of lubricant, introduced into the upper end of the sleeve, to all of the bearings and to the surfaces of flange 13, while the nut 15 serves as a bottom closure to retain the lubricant within the closed container thus formed by the sleeve.

Suitable means are provided for driving (rotating) the spindle 11 and, consequently, the cutter or engraving tool carried by the chuck 4, and suitable means are also provided for feeding the sleeve 10 that carries the spindle and its cutter, toward and from the work and for limiting the cutting or working depth of the cutter.

For instance, in the particular embodiment illustrated, I provide a pair of parallel upstanding guide studs or posts 17 rising from and fixed to the front end of the arm or cutter head carrier 7$^b$, or from the upper end of the head or housing 7$^c$, of said carrier. These posts 17 are spaced a substantial distance apart and rise from diametrically opposite portions of the upper end of 7$^c$ with the vertical bore of said head in which slide 10 is confined, intervening between and spaced from the posts. A feed yoke or other member, for the slide 10 and consequently for the cutter is arranged above head 7$^c$ and the slide, and located on said guides (posts 17). In this embodiment, this feed member or yoke embodies a cross member 18 formed with vertical end guide sleeves 19 that receive, and under certain conditions, are slidable vertically on the guides 17. Coiled expansion springs 20 are located on the lower ends of guides 17 and are adapted to be compressed between the top face of head 7ᶜ and shoulders forming abutments at the lower end portions of the guide sleeves 19. The sleeves carry set or clamping screws 21 extending transversely therethrough and having accessible front heads, whereby the screws can be tightened to clamp the sleeves to the guides 17 against independent relative movements of the yoke and the head 7ᶜ, and whereby the screws can be loosened to permit vertical movement of the yoke independently of the head 7ᶜ, so that the yoke can then float on the springs 20.

The feed member 18—19, also embodies a top rigid cross member or cap 22, in this instance, clamped to the upper ends of the end uprights or sleeves 19 of said feed member by suitable means such as screws 23. This cap is provided with a fixed vertical pin 24, in this instance tapering upwardly to a point, or conical in form. This pin extends upwardly from the top of the cap and is centrally arranged on the cap and the longitudinal axis of this pin is accurately alined with the longitudinal axis of the cutter spindle 11.

This pin is located and arranged to co-operate with a forming guide carried by the frame to control the vertical position of the cutter while at work, where curved surface work is to be operated on, as hereinafter more fully set forth.

The cutter feed mechanism connects the feed yoke or member and the cutter slide (sleeve 10), and said slide is thus hung from and carried by said feed member through the medium of said feed mechanism. This feed mechanism, in this embodiment, comprises a rotary vertical feed screw 25, at its upper end having journal portion 25ᵇ, mounted to rotate in a central forwardly projecting arm 18ᵃ, of the transverse portion 18 of the feed yoke or member. The rotary feed screw 25 is mounted in said arm against longitudinal movement, and depends therefrom centrally in front of the head 7ᶜ and the cutter slide, and the sleeve 10, of said slide is provided with and carries a vertical non-rotary feed nut 26 receiving and meshing with said screw, whereby the slide is held in the desired vertical position with respect to the feed yoke or member, and the cutter in the desired vertical position with respect to the work.

The head 7ᶜ is formed with a vertical front slot to expose the front central portion of the sleeve 10, and permit access of the feed mechanism thereto, although I do not wish to so limit my invention.

In this embodiment, a bracket 27, is fixed to said sleeve 10 and projects forwardly through and moves vertically in said slot. This bracket carries the feed nut 26, through the medium of a forwardly extending fixed ring or eye 27ᵃ, having a vertical bore in which the upper end of the nut is located. The nut 26 is normally fixed to said eye by a clamping nut 26ᵃ, threaded and adjustable on the upper end of the feed nut, and an annular flange or shoulder 26ᵇ, of the feed nut that is clamped against the under face of eye 27ᵃ when the clamping nut 26ᵃ is screwed down onto the top face of said eye.

The feed nut 26 depends from the bracket eye 27ᵃ, and is vertically elongated. The feed screw 25 extends through the feed nut and depends therefrom, and at its lower end below the nut, said screw is provided with the stop 25ᵃ, normally fixed to the screw and of enlarged diameter with respect to the screw. The cutter slide (sleeve 10 and parts carried thereby) is provided with a stop opposing the screw stop 25ᵃ, to limit and determine the feed toward the work, i. e. the relative downward movement of the cutter and its slide toward the work, and provision is made for relative adjustment between these two stops to vary and predetermine the limit of cutter movement toward the work i. e. the working depth of the cutter.

In the example illustrated, the stop carried by the cutter slide is vertically adjustable and is formed by the lower end of a screw threaded sleeve 28, located above the stop 25ᵃ, carried by the feed screw. This sleeve 28 is located and adjustable on the screw threaded lower end portion of the feed nut 26, the nut extending longitudinally into the sleeve and carrying the same through the medium of the meshing screw threads. The exterior surface of the stop sleeve is exposed and accessible from the front of the machine and is preferably formed to permit easy rotation of the sleeve by the fingers. The exterior surface of the sleeve is preferably formed with accurately spaced depressions or serrations 28ᵃ, and with a scale all to cooperate with a spring finger 29 fixed to and depending from the eye 26ᵃ, with its free end forming an index and also engaging the serrated surface to yieldingly lock the sleeve against accidental rotation. It will be noted, that rotation of the feed screw in one direction will through the medium of the feed nut 26, cause elevation of the cutter slide with respect to the feed yoke 18, to elevate the cutter from the work, and during such upward movement of the cutter slide, the stop sleeve 28 moves upwardly and away from the feed screw stop 25ᵃ. When the feed screw is rotated in the opposite direction, the feed nut is caused to travel down carrying the cutter slide and its cutter toward the work, which cutter feeding movement can continue until the lower end of stop sleeve 28 abuts the top face of feed screw stop 25ª, whereby the cutter reaches its limit of downward movement with respect to the work and consequently its working position.

It is obvious that this limit of working position of the cutter, can be most accurately set and predetermined, by vertical adjustment of the sleeve 28 on the feed nut.

Any suitable means can be provided for the manual rotation of the feed screw 25, for feeding the cutter to and for elevating the cutter from the work. For this purpose, I show cutter feed operating handle 30 exposed and easily accessible at the front of the feed yoke, and fixed to short horizontal forwardly-projecting feed screw operating shaft 31 operatively coupled to the feed screw to rotate the same, through the medium of spiral gears 32, although I do not wish to so limit all features of my invention. This feed screw operating shaft 31 is mounted in and carried by a bearing boss 33 from and rigid with the forwardly projecting arm 18ª of the feed yoke 18. This boss is shown provided with a split clamp operated by a clamping screw having readily accessible handle 34, to lock the shaft 31 against rotation and to release the shaft for rotation.

The driving transmission for the cutter spindle embodies a rotary spindle driving member mounted in and carried by the feed yoke or member 18, and having constant rotary driving connection with the spindle through the medium of a longitudinally slidable or extensible coupling connection. Any suitable transmission can be provided for rotating or driving said spindle driving member, although in the example illustrated I show a friction belt or cord transmission for rotating said member through the medium of a belt or cord pulley 35, fixed to said member. The spindle driving member, in effect constitutes a section of the cutter spindle, alined therewith in upward continuation thereof, hence the cutter spindle as an entirety consists of an upper section mounted in the feed yoke and rigid with pulley 35, and a lower section carried by the cutter slide and carrying the cutter.

In the embodiment shown, the feed yoke 18, is formed with a central vertical bore longitudinally alined with the cutter slide sleeve, and a cylindrical vertical elongated sleeve 36 is fixed to said yoke and extends through said bore from a point above to a point below said bore. This sleeve is open at its lower end and depends from the feed yoke and extends a distance downwardly into the cutter slide sleeve 10, through the otherwise open upper end of said slide sleeve with a clearance fit between the telescoping ends of said sleeves. The upper end portion of the slide sleeve is preferably formed with an internal annular seat or groove receiving and retaining a packing ring or packing material 37 surrounding and fitting the exterior surface of the fixed sleeve 36 to exclude dirt, etc., and to retain lubricant. This packing slides vertically on the surface of the fixed sleeve 36 during vertical movement of the slide sleeve with respect to the fixed sleeve.

The spindle driving head or member, or the upper or supplemental section 38, of the cutter spindle is longitudinally arranged within the fixed sleeve 36 in axial alinement with the driven cutter spindle 11, and extends upwardly to a point above said sleeve 36 and there enters the hub 35ª, of drive pulley 35 to which it is normally fixed in any suitable manner, as by cross pin 35ᵇ.

In the particular embodiment shown, the spindle driving head 38, is suspended by its upper end, and depends, from the driving pulley 35, the hub of which is located above the fixed sleeve 36. The head 38 is carried by the pulley and the pulley is carried by its bearings on the upper end of sleeve 36. The flange or peripheral portion 35 of this pulley is in the form of an annular depending skirt surrounding the top end of the sleeve 36 that projects up from the cross portion 18 of the cutter feed yoke, and any suitable bearings are provided between the depending skirt of the pulley and the projecting upper end of sleeve 36. For instance, I show suitable ball bearings for this purpose, wherein the balls 39, travel in grooves or raceways in the bearing ring 40 fixed to and exteriorly surrounding the reduced upper end of sleeve 36, and in the bearing ring 41 secured to and within the skirt of the rotary pulley 35, the balls being confined between fixed ring 40 and rotating ring 41. The ring 41 is clamped in the pulley by ring nut 42 screwing into the lower end of the pulley skirt and providing an annular top oil retaining receptacle 42ª below the series of balls, while the top web or hub portion of the pulley provides a normally closed oiling duct 35ᶜ, through which lubricant can be introduced to the space between the adjoining faces of the rings 40, 41. The upper end of the fixed sleeve 36 is of reduced diameter, as hereinbefore mentioned, thereby forming the sleeve with an upwardly facing exterior annular shoulder below the ball bearings of the pulley on the sleeve, and also forming the sleeve with an interior annular downwardly facing shoulder 36ª. The rotary driving head, member or upper section, at its upper end forms a spindle or cylindrical shank 38 while its lower end, is hollow and of enlarged diameter and externally cylindrical, forming a hollow coupling head or hood 38ª open at its lower end and providing exterior annular upwardly facing shoulder 38$^b$, below and opposing the shoulder 36$^a$ of fixed sleeve 36. This hollow head 38$^a$, is axially alined with and located within the fixed sleeve 36, with clearance between the inner surface of the sleeve and outer surface of the head, and the lower end of said head preferably terminates short of the lower end of sleeve 36.

In the embodiment illustrated, the spindle 11 is elongated upwardly, and longitudinally enters the head 38$^a$, through its open lower end, and is operatively coupled to said head by any suitable means, to be driven thereby while permitting free longitudinal sliding movement of the spindle within the head. In the particular embodiment illustrated, the rotary driving connection between the driving head and the spindle 11, is established through the medium of diametrically-opposite elongated keyways 11$^b$ cut in the spindle 11 and opening through the upper end thereof, and keys 44, entering said keyways and fixed to a sleeve 45, loosely surrounding the spindle, and driven from the head by keys 46, operatively coupled to the head to rotate therewith and entering longitudinal exterior keyways 45$^a$, cut in the loose sleeve 45, so that the spindle is driven from the head through the medium of keys 46, sleeve 45 and its keys 44, while the spindle is free to move longitudinally in the rotary driving head and its internal sleeve 45. The sleeve is yieldingly held down by coiled spring 49 against a retaining ring 48, normally fixed in the lower end of the head.

The keys 44 are fixed to the floating coupling sleeve 45, and the keys 46 are fixed to the driving head 38$^a$, in any suitable manner or by any suitable means, although in the particular example illustrated, I happen to show each key formed with a pin that enters a perforation in the sleeve or in the head and is upset to constitute a securing rivet.

Figure 3:
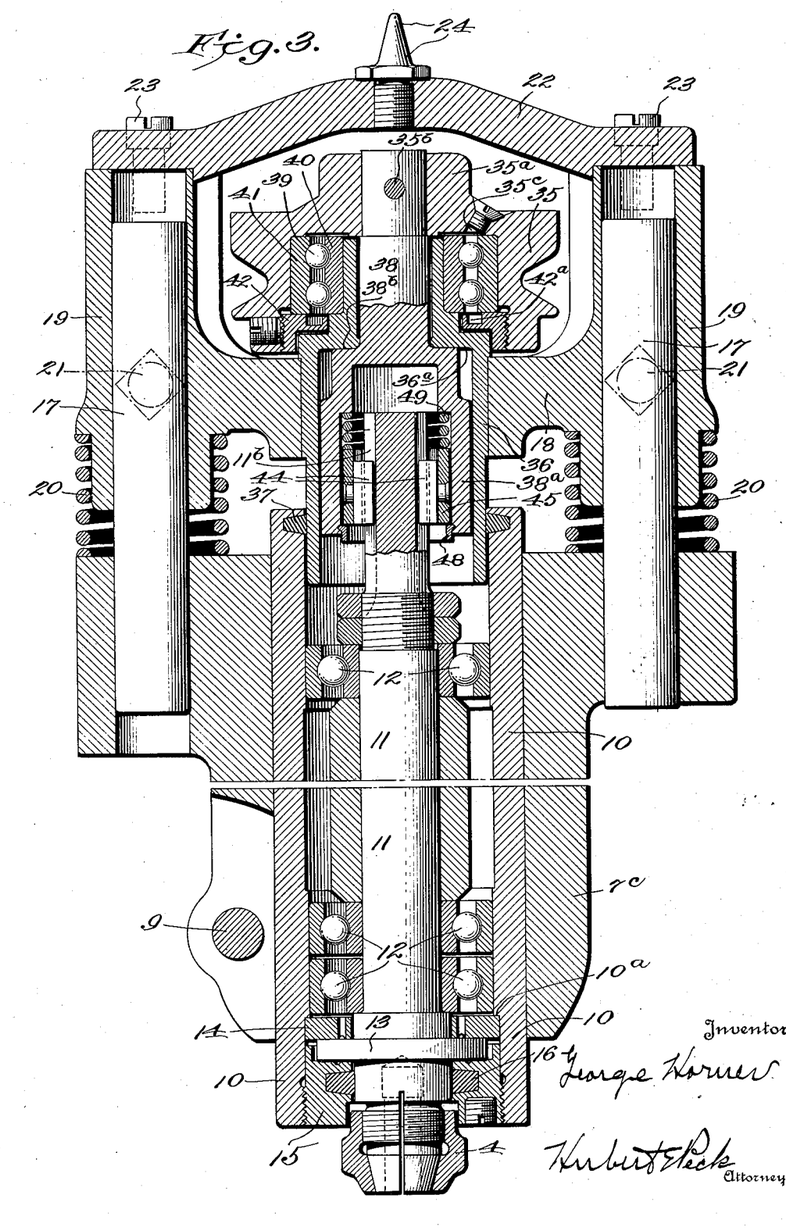
Fig. 3 is a detail vertical section of the cutter head on an enlarged scale.
Figure 4:
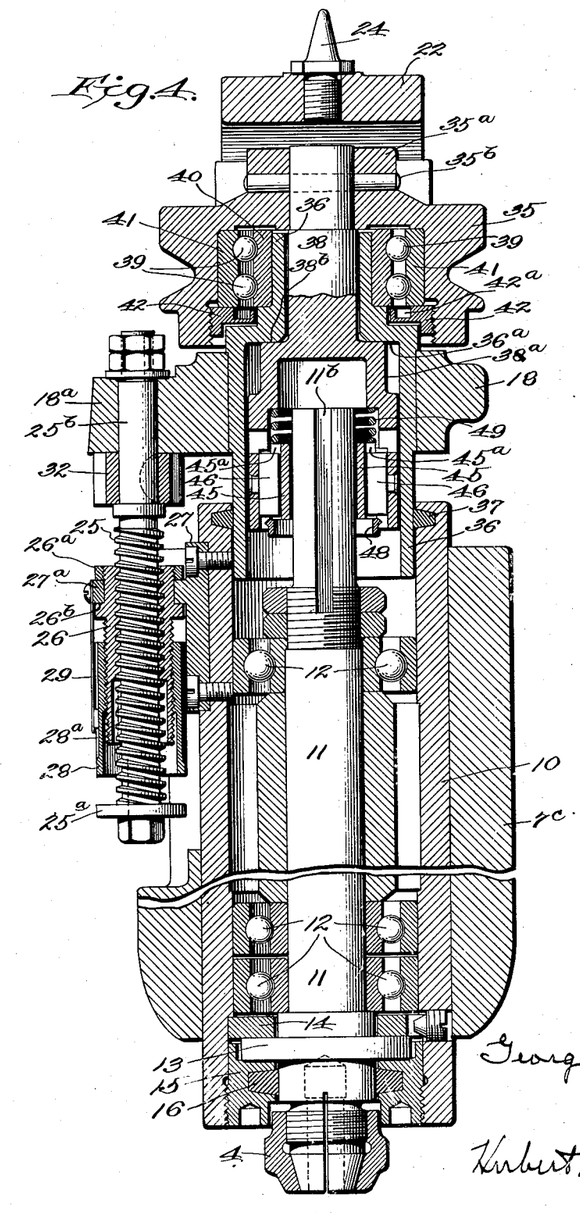
Fig. 4 is a detail vertical section of the cutter head taken in a plane at right angles to the plane of the section Fig. 3.
Figures 5, 6, 7:
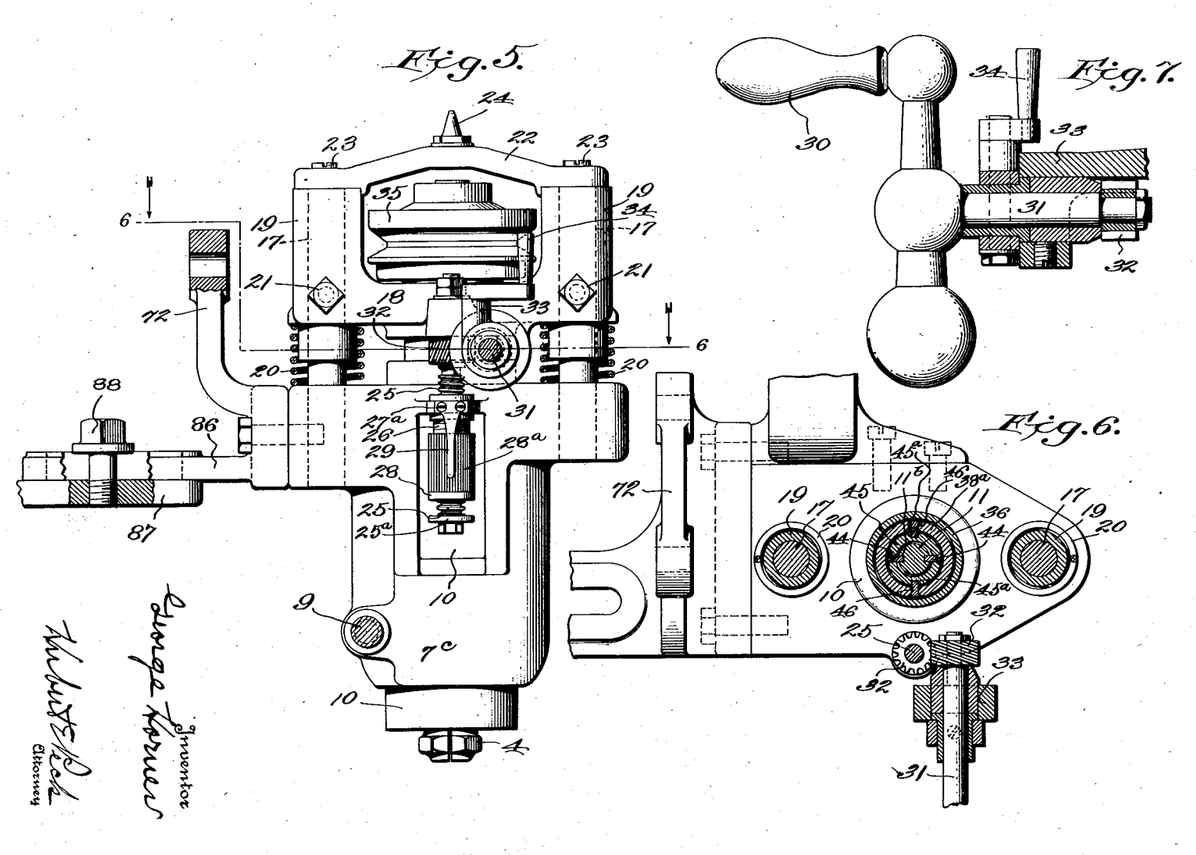
Fig. 5 is a detail front elevation of the cutter head, certain parts being broken away.
Fig. 6 is a detail cross section on the line 6—6, Fig. 5.
Fig. 7 is a detail vertical section showing the cutter feed operating handle and its shaft.

The floating coupling sleeve and the spring 49 are confined in the driving head by split spring retaining ring 48 expanded into an annular retaining groove (see Figs. 3, 4) in the inner surface of the lower end of the head.

The coupling sleeve and the keys and keyways through which the spindle 11 is driven from the head 38$^a$, provide sufficient clearance and freedom to permit the sleeve to float and prevent transmission of vibration and "belt pull" to the spindle, and permit automatic centering of the sleeve with respect to the spindle even though the driving head is not alined with the spindle with absolute accuracy. Vibration that might cause "chattering" is absorbed by the spring 49, which yieldingly holds the floating coupling and power transmission sleeve, against the retaining ring 48.

When the cutter is to operate on flat work that requires the cutter to work in one plane, after being set in its operative plane by the feed screw and nut, hereinbefore described, the feed yoke 18—19 is secured to the guides 17 by tightening the clamping screws 21, so that the feed yoke is then maintained in a fixed position with respect to the head 7$^c$ of the pantograph mechanism, and is not then permitted relative vertical movement with respect to the pantograph mechanism.

However, I provide means whereby the cutter can be employed to work on curved work normally fixed on the work table 5. For instance, sometimes it is necessary to engrave, or duplicate a pattern, on a vertically convex, concaved or spherical area of work surface necessitating vertical movement of the cutter in following such surface, i. e. requiring the cutter to follow a curved working surface and thus necessitating corresponding vertical movement of the cutter slide and its feed yoke. The pantograph mechanism is not vertically movable while the cutter is at work and being shifted horizontally by the pantograph as the tracer follows the flat master or pattern fixed on the pattern table 2. Hence, to cause the cutter to duplicate the pattern on curved work horizontally fixed on the work table, the feed yoke and cutter slide must move vertically independently of the pantograph while being shifted horizontally by the pantograph and while the rotation of the cutter is being maintained and the relative positions of the cutter and feed yoke remain fixed.

I accomplish this result, by loosening the set screws 21 so that the feed yoke is free to move vertically on the guide rods 17 and hence is vertically movable with respect to the pantograph, and by providing a relatively and normally fixed forming-guide 50 to cooperate with the pin or projection 24 against the tension of the springs 20, in limiting the upward movement of the feed yoke and consequently in holding the cutter down to its work. When the cutter slide feed yoke 18, 19, is thus released (by loosening the clamp screws 21) for free vertical movement relative to the pantograph mechanism, the feed yoke and the cutter slide and cutter carried thereby, are upheld by the springs 20 seated on the cutter head carrier 7$^c$.

The so-called forming guide 50 is normally fixed to the machine frame, is mounted independently of the pantograph mechanism and is relatively fixed with respect thereto, and is arranged above the feed yoke and its follower point 24, with the point 24 in contact with the forming guide bottom surface. The forming guide is at such elevation as to hold the feed yoke depressed with the springs 20 under compression and holding the point 24, upwardly under pressure against the bottom surface of the forming guide. The feed yoke and cutter slide thus float on the springs or between the springs and the surface of the forming guide engaged by the point 24. With the feed yoke and cutter slide thus held in this suspended or floating condition, as the cutter head is shifted horizontally by the pantograph mechanism, the point 24 travels over the working face of the forming guide and is caused to follow the elevations and depressions of said face and when operating on curved work the rotating cutter moves with said point 24 both horizontally and vertically and follows the vertical movements thereof.

The under or working face of the fixed forming guide 50 that serves as an abutment and guide for the point 24 under the pressure of the springs 20, is an exact replica or duplicate of the area as well as of the topography or surface contour of the curved surface of the work that is to be engraved or operated on. For instance, if the area of the work to be operated on, is spherically convex, the working face of the forming guide will be of the same area and spherical form but concave, and accurately located directly over and alined with the said area of the work, and the same requirements follow where the work is cylindrically convex, and where cylindrically concave. For instance, in Figs. 1, 9 and 11, I show a forming guide 50, presenting an elongated convex working surface area, which is an exact replica in area and curvature of an elongated concaved area of the work that is to be engraved or operated on by the rotary cutter. This forming guide surface is accurately fixed directly opposite or over the surface of the work, as the point 24 is accurately alined with the axis of the rotary cutter, and the said axis is accurately maintained in a vertical position during the working operation and also the distance from the point of the cutter to the tip of the point 24 is maintained fixed during the working operation.

Figures 11, 12, 13, 14:
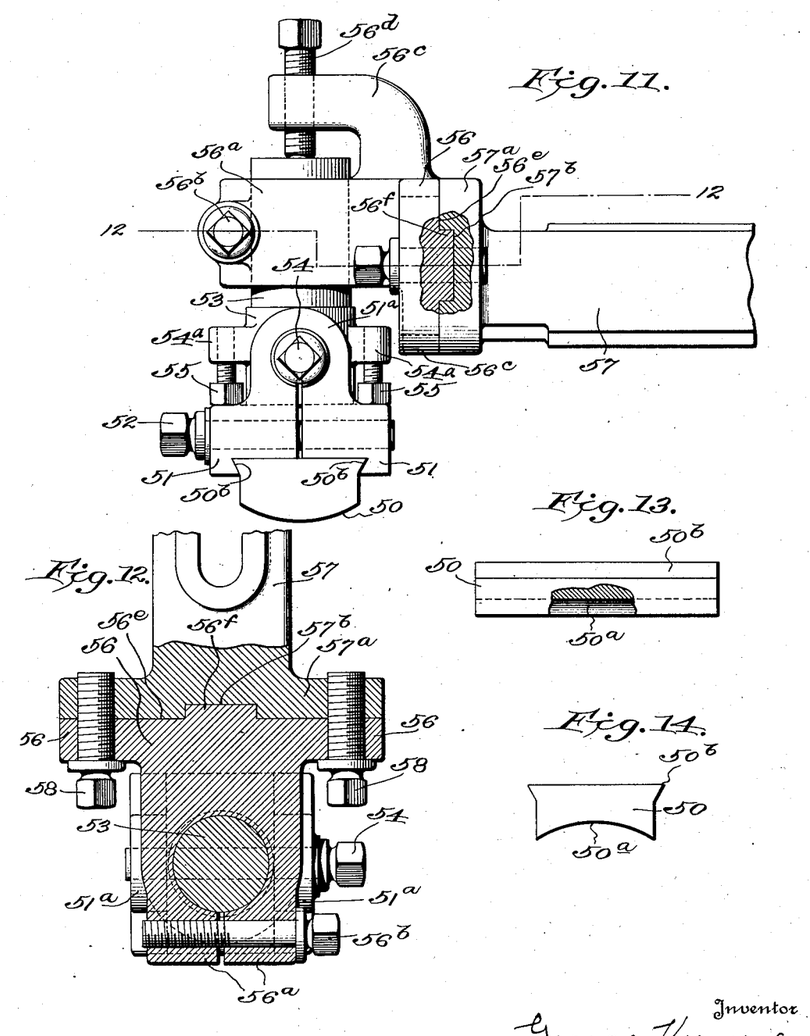
Fig. 11 is a detail side elevation of a portion of the forming guide support, portions being broken away.
Fig. 12 is a detail section on the line 12—12, Fig. 11.
Figs. 13 and 14 are detail views of a forming guide for convex work.

In Figs. 13 and 14, the forming guide 50 presents an elongated concaved cylindrical working face 50ª which is a replica of the convexed cylindrical panel or area of the work over which the cutter is to travel and operate. Other forms of forming guides are provided where the curved formation of the work requires, as the guide surface is a duplicate as to dimensions and curvation or form of the panel or area of the work over which the cutter is to operate.

It will also be noted, that the tip of the guide pin 24 and the smooth curved working surface of the forming guide are both so formed as to cooperate in enabling the pin 24 to slide easily over such working surface while held under force or tension thereagainst. It will be understood that as the pantograph mechanism shifts the cutter head horizontally as the tracer follows the pattern (the rotary cutter having been fed down to and fixed at the desired cutting or working depth) that the guide pin 24 will be shifted back and forth over the surface of the forming guide to cause, by a sort of cam or wedging action, depression and elevation of the pin and cutter, independently of the pantograph, to accurately follow the elevations and depressions of the surface of the work.

The forming guide 50 is used only when the surface to be operated on is other than plane or flat, and hence I prefer to provide a removable forming guide or an attachment whereby the guide can be readily shifted from operative position. Also, the necessities of the case where a forming guide is to be used, require accurate location thereof with respect to the cutter and surface to be operated on, and hence, in the example illustrated, I provide supporting means for the forming guide capable of universal adjustment and location thereof over and with respect to the work table.

For instance, I show the forming guide 50 in the form of a metal block having a smooth bottom or underside working face, while the top face of the block is flat and the upper portion of the block is formed with beveled side ribs 50ᵇ, although I do not wish to so limit my invention. I provide a supporting bracket and means for normally fixing this bracket to the machine frame and also provide this bracket with a forming guide holder by which the guide can be fixedly held overhanging the cutter head and at any desired elevation or location over the work table.

The holder for removably receiving the forming guide, in this example, embodies a clamp having a pair of opposing depending jaws 51, undercut at their opposing faces to receive and fit under the ribbed side edges of the block 50 and having flat faces to abut the flat top of the block. These jaws are controlled by a transverse clamping bolt 52 whereby the jaws can be set to rigidly grip the block and hold the same with its bottom working face exposed. In other words, the depending clamp holds the block approximately suspended from and below the clamp. This clamp is adjustably carried by a vertically and rotatably-adjustable preferably-cylindrical vertical swivel block or hub 53 through the medium of a pair of ears 51ª, rigid with and extending up from the clamp at opposite sides of the lower portion of the block 53, and coupled thereto by transverse or horizontal clamping and pivot bolt 54. By loosening said bolt 54, the clamp can be swung forwardy or rearwardly to correspondingly level or angularly shift the working face of the guide block transversely. By tightening bolt 54, the clamp is fixed in the desired angular position.

If so desired ears 54$^a$ can be provided projecting forwardly and rearwardly from the lower portion of the swivel block above the clamp or holder and each having a vertical tapped hole adjustably receiving a vertically adjustable screw 55 the head of which abuts the upper side of the clamp. By means of these front and rear vertical screws 55 the clamp can be locked in the before mentioned angular adjustment and by manipulation of these screws a micrometer adjustment can be secured, although I do not wish to so limit my invention. The swivel block 53 is carried by a swivel head 56 having a forwardly projecting split clamp or hub 56$^a$ with a vertical bore adjustably receiving the vertical cylindrical shank of the block 53. The split clamp 56$^a$ is provided with clamping bolt 56$^b$ by means of which the clamp can be loosened to permit rotative and vertical adjustment of the swivel block and consequently of the forming guide, and by which the block can be locked in the desired adjustment. The swivel head 56 can be formed with an upwardly and forwardly projecting rigid arm 56$^c$ located above the upper end of the swivel block and carrying vertically adjustable stop and micrometer adjustment screw 56$^d$, at its lower end abutting the top end face of the swivel block to accurately control the vertical adjustment of said block and the forming guide.

The swivel head (and consequently the swivel block and forming guide holder) is carried by a straight normally fixed rigid longitudinally elongated horizontal bracket arm or bar 57 extending rearwardly from the swivel head and to which said head is normally-secured in fixed relation. At its front end, this bar is formed with a vertical plate 57$^a$, providing at its vertical front face a central cylindrical horizontal socket 57$^b$. The rear end of the swivel head 56 provides a corresponding vertical face 56$^e$ and central cylindrical rearwardly projecting boss 56$^f$. The swivel head 56 is normally fixed to the bar by clamp screws or bolts 58 extending through segmental slots 56$^g$ in the swivel head concentric with the boss 56$^f$. The vertical boss 56$^f$ fits the socket 57$^b$ and forms the horizontal axis on which the swivel head is rotatable (when the screws 58 are loosened) to level up the forming guide longitudinally or on an axis at right angles to the angular adjustment axis 54. The elongated bracket arm or bar 57 is carried by the horizontal elongated rigid normally fixed primary bracket arm or bar 59 arranged over the machine frame and normally-fixedly clamped thereto by one or more bolts 60, extending through a longitudinal slot in bar 59 (see Fig. 2) whereby said bar 59 can be adjusted longitudinally (on loosening said bolts 60) to carry the bar 57 and the forming guide carried thereby horizontally to any desired position above and longitudinally of the work table, i. e. toward either end of the work table with respect to Fig. 2 of the drawings. Horizontal forward and rear adjustment of the forming guide or horizontal adjustment transversely of the work table is provided for by rendering the bar 57 adjustable longitudinally of itself and transversely across the bar 59 that supports the bar 57 and attached parts, the two bars 57, 59, being arranged at right angles.

The stiff strong bar 57 traverses the adjacent end of the primary supporting bar 59, and is normally rigidly clamped thereto by bolt 61 extending through a longitudinal slot in bar 57, so that on loosening such bolt, bar 57 that overhangs the work table and cutter head, can be adjusted forwardly or rearwardly and then fixed in the desired horizontally fore and aft adjustment.

If so desired, the forming guide and its supporting attachment can be removed from and applied to the engraving machine, as a unit, by removal and by application of the clamping bolts 60. The universally adjustable supporting devices for the forming guide, render it possible to fix said guide over any portion of the work table, at any elevation required by the work, and at any horizontal or angular position required by the location, shape or size of the curved surface of the work.

In the particular example illustrated, the cutter spindle is driven by a suitable belt or band friction drive transmission from a suitable source of power, such as electric motor 62 fixed to the main frame of the machine. For instance, I show electric motor 62, normally-fixed to a shelf or support 63 rigid with or fixed to the lower part of the machine frame or base. The horizontal rotary main or drive shaft of the motor, is (in this example) equipped with and drives a cone pulley 64, receiving and driving an endless friction band, cord or belt 65, that extends upwardly to and drives a corresponding cone pulley 66 carried by and driving an elevated horizontal countershaft 67. The countershaft is equipped with and drives a pulley 68, and this pulley 68 drives the cutter spindle through the medium of an endless laterally extending friction drive band 69 that operatively connects and fits the pulley 35 of the cutter spindle driving head, and the pulley 68 of the countershaft. The band 69 extends horizontally from the horizontally rotating cutter spindle pulley 35 over a pair of angularly arranged separated guide or idler pulleys 70 and therefrom downwardly and rearwardly to the vertically rotating pulley 68 of the horizontal countershaft.

The pulleys 70 rotate on parallel axes both inclined in the same direction from the vertical so that the pulleys are approximately horizontally disposed.

These pulleys 70 are mounted in horizontally extending yoke or forked brackets 71, projecting outwardly from and separately adjustably bolted to an arm 72 fixed to the pantograph arm $7^c$ that carries the cutter head and said arms extend upwardly to positions beside and spaced from the cutter feed yoke 18—19.

In view of the desirability of maintaining the constant uniform high rate of speed of the rotating milling tool or cutter during each engraving operation and while the cutter is being shifted horizontally over the work it is necessary to maintain the driving cords or belts under uniform tension while accommodating and allowing for various movements of the cutter and its driving head.

Various mechanisms and arrangements can be provided for attaining this desirable result, although in the particular embodiment illustrated, I support the countershaft 67 at the upper end of an upstanding vertically elongated arm or lever 74 at its lower end, supported by and mounted to rock on a horizontal axis 75 alined with the motor shaft and axis of pulley 64 and in effect forming an outward continuation thereof. This axis and said arm 74, are supported by a rigid arm 76 fixed to and projecting from a lower rear corner of the machine frame. The load carried by this upright swingable arm or lever 74 above its axis or fulcrum 75, is counterbalanced in any suitable manner, as by adjustable counterweight 77, to render the arm or lever freely swingable as the cutter head, connected with said arm, is moved over the work.

At its upper end, this vertically swingable upright arm 74, is provided with a carrier for the countershaft 67, and this carrier is composed of a head freely rotatable on a vertical axis or an axis alined with the longitudinal axis of the arm 74. This rotatable head or countershaft carrier embodies a hollow T-shaped member 78, the upper horizontal cross head or portion of which receives the countershaft and supports and houses the bearings thereof. Said shaft 67 extends longitudinally through and projects beyond the ends of said cross portion, and at one projecting end carries the pulley 68 and at the other projecting end carries the cone pulley 66.

Figures 8, 9, 10:
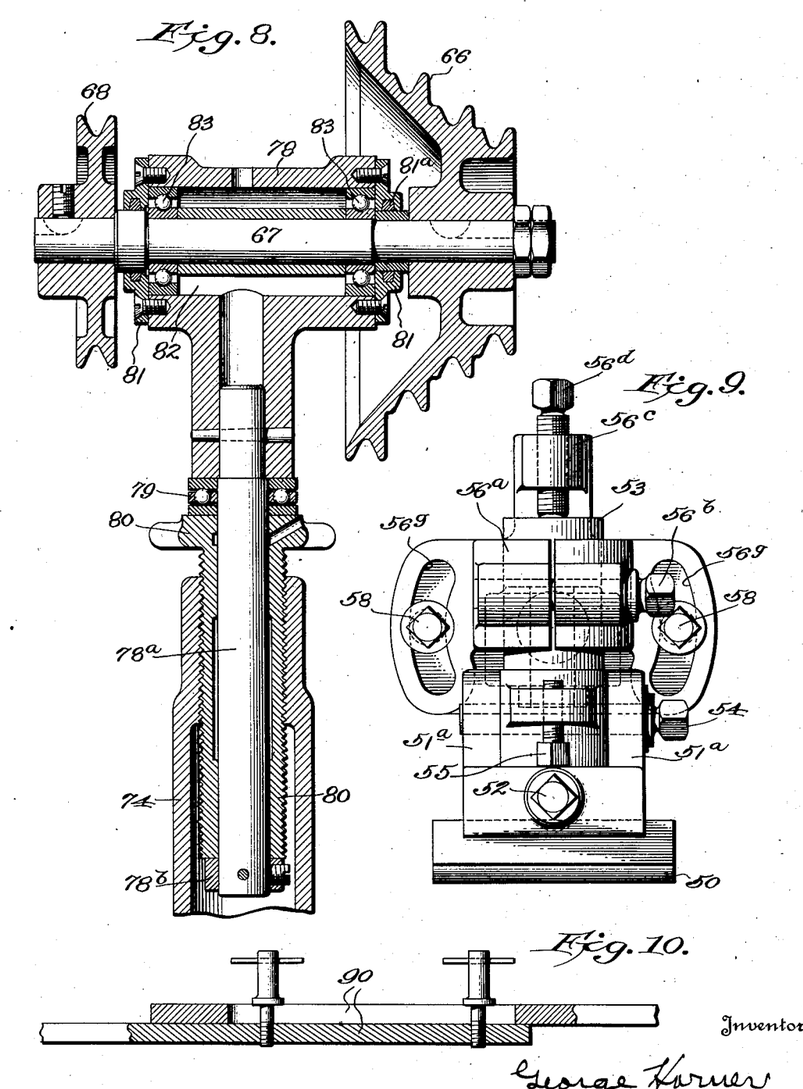
Fig. 8 is a detail vertical section of a part of the upright swingable arm and the countershaft mounting carried thereby for the belt drive.
Fig. 9 is a detail front elevation of a forming guide and support therefor.
Fig. 10 is a detail view of a portion of the adjustable link connection between the cutter head and the upright swingable arm of the belt drive.

The vertical arm of this cross head or member is alined with and extends up from the lever or arm 74 and is provided with a fixed depending stem $78^a$, entering and rotatable in said arm. The countershaft head or carrier is freely rotatable on and is upheld by a thrust annular rolling bearing 79 at the upper end of the arm and surrounding the spindle or stem $78^a$ (Fig. 8). In this instance, I show a vertically or longitudinally adjustable nut or sleeve 80 screw threaded in the upper end of the hollow arm 74, and carrying the countershaft carrier or head, for the purpose of raising and lowering the countershaft to adjust the tension of the driving bands and to serve the purpose of a belt tightener. The spindle $78^a$ extends longitudinally through and is rotatable in said sleeve 80 and is confined against upward movement therefrom by stop $78^b$ on the lower end of the spindle, while the ball bearing 79 rests on the upper end of the sleeve.

In the particular example illustrated, the ends of the hollow top cross member of head 78, are closed by end caps 81, having central bores for the countershaft 67, and the inner walls of these bores are preferably formed with annular grooves retaining packing $81^a$ fitting the shaft (or sleeves fitted thereon) to prevent passage of dirt and lubricant along the shaft. A tight lubricant chamber 82 is thus formed within the head for the shaft and its ball or other bearings 83, which are arranged within this chamber (Fig. 8).

Figure 1:
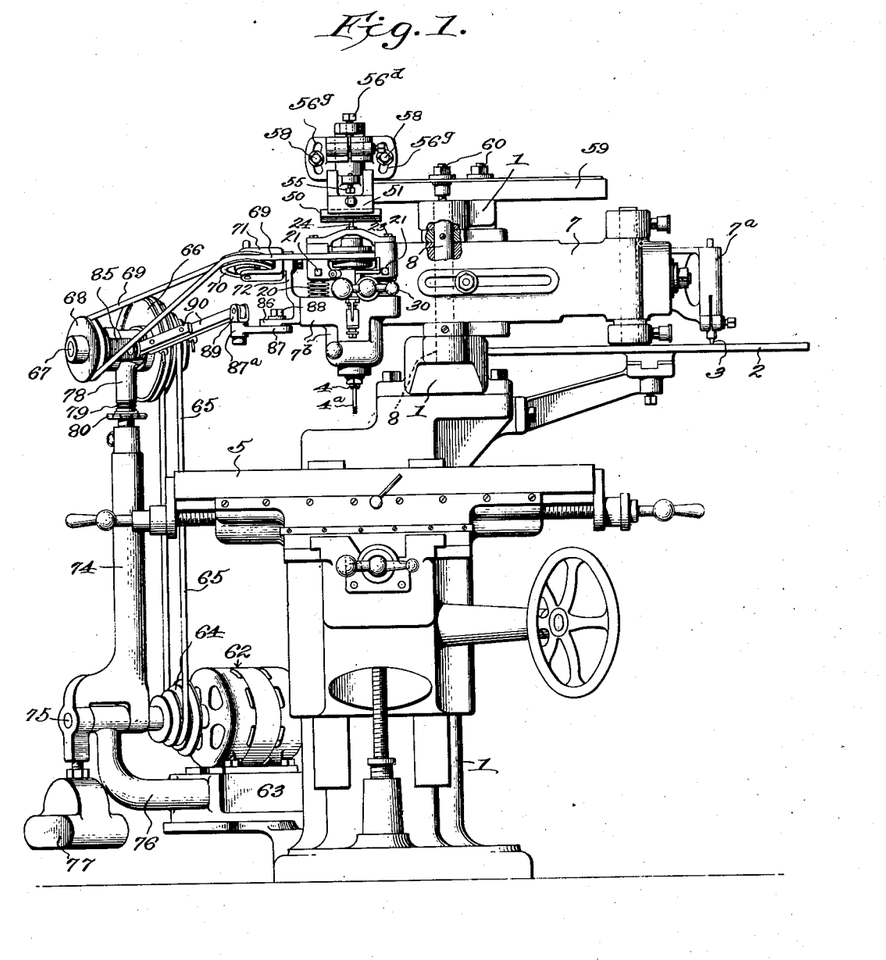
Fig. 1 is a front elevation of an engraving or a milling machine of the pantographic duplicating type.
Figure 2:
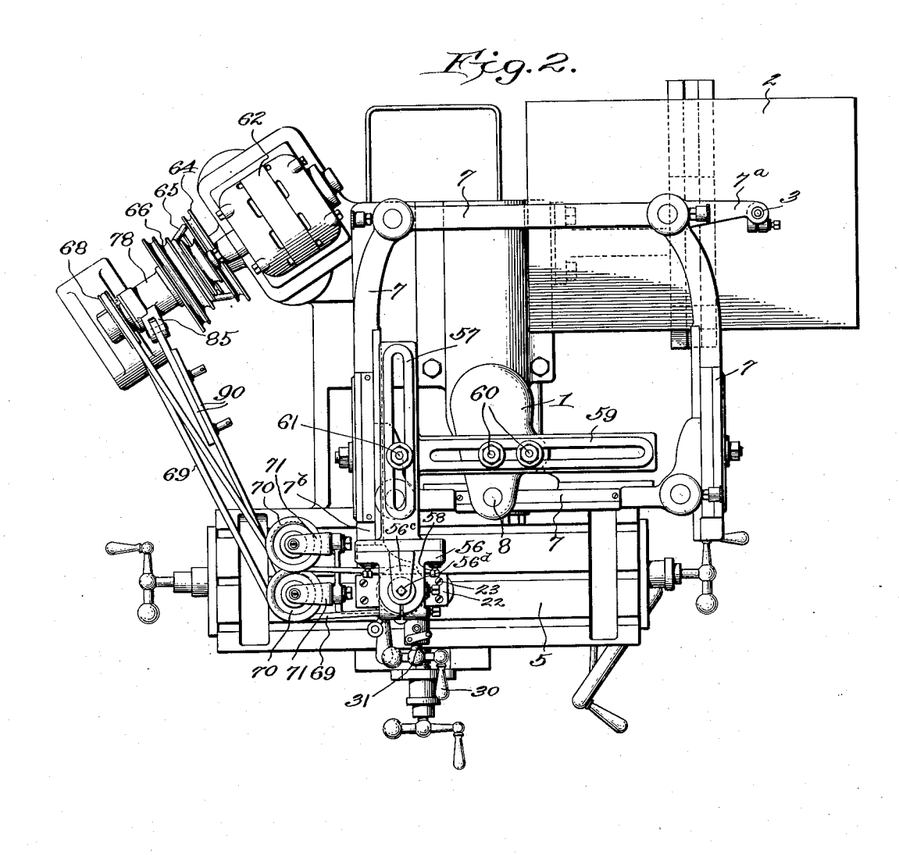
Fig. 2 shows the machine in top plan.

In order to maintain a fixed relation between the countershaft 67 and the cutter spindle driving pulley 35, at all times during the operative movements of the cutter head over the work table, the countershaft carrying head is connected with the cutter head carrier, as with the cutter head support $7^b$ of or connected with the pantograph mechanism. For instance, I show a pivotal adjustable push and pull link connection between a lug 85 rigid with the cross member of the countershaft head 78 and an ear or lug 86 rigid with the cutter head support or carrier $7^b$ (Figs. 1 and 2). This connection, in the example shown, consists of a normally fixed bar or link 87 clamped to the lug 86 in longitudinal adjustment by clamping bolt 88 (the lug 86 or the bar 87 being longitudinally slotted), and at its outer end formed with vertical bearing hub $87^a$, receiving and retaining a vertical horizontally rotatable swivel head 89, to the upper end of which is pivotally secured one end of a vertically swingable stiff link connection 90, the other end of which is pivotally secured to lug 85 by a horizontal pivot. The straight normally stiff link connection 90 (Figs. 1, 2, 10) is preferably rendered longitudinally extensible and contractile by being formed of overlapping sections normally fixed together by clamping means extending through a longitudinal slot in one of the sections, to serve as a belt tightener should the belt to the cutter spindle pulley 35 become unduly slack.

The universal connection thus established between the cutter head and the upright swingable counterbalanced arm or lever through the horizontally swingable head thereon, maintains the necessary constant relation between the shaft 67 and the axis of pulley 35 to keep the endless friction driving transmission uniformly operative from the driving pulley 68 to pulley 35, whatever the position of the cutter head over the work table during the engraving operation. And in fact, this same relation and result can be maintained, if a single endless belt should be driven by and extended from the pulley 64 to the pulley 35 over idler pulleys on the freely swingable cross head of the lever or arm 74, in the place of the driving and driven pulleys on the countershaft.

Where the countershaft is employed, such shaft can be otherwise driven than by the pulley 64 and belt therefrom, and also where pulley 64 is employed, it can be driven otherwise than by the motor shown having its shaft alined with the axis of pulley 64, as said pulley might be driven by a belt or otherwise.

It is evident that various changes, modifications, and variations might be resorted to, that parts might be omitted or features added, all without departing from the spirit and scope of my invention, and hence I do not wish to limit myself to the exact disclosures hereof, even though for purposes of explanation I have described in detail the particular example illustrated.

With the desire and intention of securing the fullest and broadest protection, legally possible, what I claim is:

1. In an engraving machine and the like, in combination, a cutter head provided with a rotary cutting tool spindle having a driven pulley for driving said spindle, mechanism for moving said head laterally over the work, an endless friction belt transmission for driving said pulley, and supporting means for said transmission constructed and arranged to maintain said transmission under uniform tension, said supporting means embodying a counter balanced upright vertically swingable lever having lateral push and pull connection with said cutter head including a head carried by said lever and rotatable on a vertical axis and carrying pulleys for said transmission.

2. In an engraving machine, in combination, a slide provided with and carrying the cutting tool spindle, a head in which the slide is movable toward and from the work, pantograph mechanism for moving said head and the slide over the surface of the work, a feed member carried by said head, means for fixing said member to the head against relative vertical movement and whereby said member can be released for relative vertical movement, feed mechanism fixing the vertical position of said slide relative to said member and supporting the slide from said member, spring mechanism for yieldingly upholding said member from said head, an independently supported relatively fixed forming guide surface for controlling the relative vertical movement of said member, slide and cutting tool against the tension of said spring mechanism when said member is released for relative vertical movement.

3. An engraving machine having a cutter head, pantopragh mechanism for moving the same over the work, a rotary cutter tool spindle, a slide carrying said spindle and mounted for sliding movement in the head, a feed member carried by the head, slide adjusting mechanism including a feed screw and nut between said member and slide, a rotary spindle driving head carried by said member, and a rotary driving coupling between said head and the spindle constructed and arranged to permit relative longitudinal sliding movement of the spindle.

4. In an engraving machine and the like, in combination, a cutter head providing with a rotary cutting tool spindle having a driven pulley for driving said spindle, pantograph mechanism for moving said head over the work, an endless friction belt transmission for driving said pulley, and supporting means for said transmission constructed and arranged to maintain said transmission under uniform tension, said supporting means embodying a counter balanced upright vertically swingable lever having universal lateral push and pull connection with said head.

5. An engraving machine comprising a cutter head having a rotary cutter spindle and its driving pulley, said spindle capable of floating vertically, means for shifting said head horizontally over the work, and a driving transmission for said pulley embodying a main drive pulley, an endless friction belt drive from said drive pulley to said spindle driving pulley, and supporting and guide means for said transmission comprising an upright lever vertically swingable from a transverse supporting axis at its lower end, said main drive pulley having its axis alined with said lever axis, a countershaft support carried by the free end of said lever and relatively oscillatory on a vertical axis and provided with a transverse countershaft carrying belt pulleys, an endless driving belt from said main drive shaft to one of said pulleys on the countershaft, an endless driving belt from said spindle driving pulley to another pulley on said countershaft, idler guide pulleys carried by the cutter head for said last mentioned belt, and a mechanical connection between said cutter head and said countershaft support to oscillate said support and swing said lever as the cutter head is moved over the work to maintain said belt transmission under uniform tension.

6. An engraving machine and the like, comprising a cutter head movable laterally over the work and carrying a rotary cutter spindle, a belt transmission for driving such spindle, and means for constantly maintaining said transmission under approximately uniform driving tension with respect to said spindle whatever the operative lateral position of the head over the work, said means embodying a fulcrumed counter-balanced member carrying transmission belt pulleys, said member being supported independently of said head and being connected therewith to constantly maintain the relative positions of the head and member during the lateral movements of the head over the work.

7. An engraving machine and the like, comprising a cutter head carrying a rotary cutter spindle, means to move the head laterally over the work, a belt transmission for driving said spindle, and means for maintaining said transmission under approximately uniform driving tension with respect to said spindle during the operative lateral movements of the head over the work, said means embodying a vertically swingable member provided with a horizontally oscillatory cross head carrying pulleys and operatively connected with said cutter head to constantly maintain relative positions of the cutter head and cross head during the operative lateral movements of the cutter head over the work.

8. An engraving machine of the pantograph type having a rotary cutting tool spindle, and a spindle bearing and carrying slide sleeve in combination with a spindle driving head operatively coupled to said spindle and mounted independently of said sleeve, substantially as shown and described.

9. An engraving machine and the like, comprising a cutter head, pantograph mechanism for moving the same laterally over the work, a rotary cutter spindle carried by said head and provided with a spindle driving pulley, a member, spaced from and to one side of said head and supported independently of said mechanism and oscillatory on a vertical axis and carrying a driven pulley, a push and pull member-oscillating connection between said member and said head to maintain the relative relation between the member and head during the lateral movement of the head over the work, and an endless spindle driving belt from said driven pulley to said spindle pulley.

10. In an engraving machine of the pantograph type, in combination, a cutter head, a feed yoke mounted to slide on studs fixed to the head, expansion spring means between the yoke and head, means to clamp the yoke against sliding movement and to release the same to slide on said studs, a forming guide, said yoke having a follower pin adapted to bear against and slide over the surface of said guide, a rotary cutting tool spindle, a slide carrying said spindle and arranged in said head, and spindle adjusting and setting means between the spindle and yoke.

11. In an engraving machine and the like, a cutting tool rotary spindle and a slide carrying the same, in combination with a rotary driving head, and a rotary driving coupling between said spindle and head permitting relative longitudinal movement between the spindle and head while maintaining rotary driving relation from head to spindle, said coupling embodying an intermediate floating self centering sleeve.

12. In an engraving machine and the like, a cutting tool rotary spindle and a slide carrying the same, in combination with a rotary driving head, and a rotary driving coupling between said spindle and head permitting relative longitudinal movement between the spindle and head while maintaining rotary driving relation from head to spindle, said coupling embodying an intermediate sleeve and longitudinally slidable key driving connections between the head and sleeve and sleeve and spindle.

13. In an engraving machine and the like, a cutting tool rotary spindle and a slide carrying the same, in combination with a rotary driving head, and a rotary driving coupling between said spindle and head permitting relative longitudinal movement between the spindle and head while maintaining rotary driving relation from head to spindle; said coupling embodying an intermediate self-centering longitudinally spring pressed sleeve longitudinally receiving said spindle in longitudinal sliding and rotary driving relations and arranged within said head in rotary driven and longitudinally slidable relations.

14. In an engraving machine and the like, a cutter head movable in various directions laterally over the work and provided with a rotary spindle adapted to receive a cutter to operate on the work, said spindle having a driving pulley, in combination with an endless friction belt transmission drive for said pulley, pulleys for said drive, and supports for said pulleys embodying a pivotally mounted elongated arm at its free end spaced laterally from and swingable toward and from said head and operatively connected therewith by means other than the spindle driving belt to maintain approximately uniform tension of said belt on said spindle pulley during the lateral movements of the head over the work.

15. In an engraving machine and the like; in combination; pantograph mechanism; a cutter head movable thereby laterally over the work and provided with a rotary spindle to actuate the cutting tool, and also provided with and carrying a driving pulley for said spindle; idler guide pulleys carried by said head and arranged laterally to one side of said spindle driving pulley; an independently supported member oscillatory on a vertical axis; a friction belt driving pulley carried by said member, an endless friction driving belt for said spindle pulley and extending laterally thereto, over said guide pulleys, and from said belt driving pulley; and a connection between said head and said member to move said member with the head to maintain said belt under constant spindle driving tension during the operative movements of the head over the work.

16. In an engraving machine and the like; in combination; pantograph mechanism; a cutter head movable thereby laterally over the work and provided with a rotary spindle to actuate the cutting tool, and also provided with and carrying a driving pulley for said spindle; an independently supported member oscillatory on a vertical axis; and a support carrying said member, said support pivotally mounted to swing and carry said member laterally toward and from said head.

17. An engraving machine comprising a cutter head having a rotary cutter spindle and its driving pulley, means for shifting said head horizontally over the work, and a driving transmission for said pulley embodying a main drive pulley, an endless friction belt drive from said drive pulley to said spindle driving pulley, and supporting and guide means for said friction belt drive comprising an upright lever vertically swingable from a transverse supporting axis at its lower end, a support carried by the free end of said lever and relatively oscillatory on a vertical axis and provided with belt pulleys, and a mechanical connection between said cutter head and said countershaft support to oscillate said support and swing said lever as the cutter head is moved over the work to maintain said belt drive under uniform tension.

18. In an engraving machine, in combination, a cutter head provided with a rotary driven spindle formed to receive the cutting tool, a tracer to follow the pattern to be reproduced in scaled relation by said tool, pantograph mechanism through the medium of which the cutter head is moved laterally over the work as the tracer follows the pattern, feed mechanism between the cutter head and spindle for setting the tool to cut the desired depth, and a forwardly extending shaft carried by said head and geared to the feed mechanism to operate the same and provided with an operating handle exposed and accessible at the front end of said head.

19. In an engraving machine, in combination, a cutter head provided with a rotary driven spindle formed to receive the cutting tool, a tracer to follow the pattern to be reproduced in scaled relation by said tool, pantograph mechanism through the medium of which the cutter head is moved laterally over the work as the tracer follows the pattern, feed mechanism between the cutter head and spindle for setting the tool to cut the desired depth, said feed mechanism embodying a member movable vertically with respect to said head, whereby the member and spindle are floatable to follow elevations and depressions of the work and produce cuts therein of approximately uniform depth, and means controlling the floating movements of the work to follow the surface elevations and depressions of the work.

20. In an engraving machine, in combination, a cutter head provided with a rotary driven spindle formed to receive the cutting tool, a tracer to follow the pattern to be reproduced in scaled relation by said tool, pantograph mechanism through the medium of which the cutter head is moved laterally over the work as the tracer follows the pattern, feed mechanism between the cutter head and spindle for setting the tool to cut the desired depth, said feed mechanism embodying a member movable vertically with respect to said head, whereby the member and spindle are floatable to follow elevations and depressions of the work and produce cuts therein of approximately uniform depth, and means whereby said member can be secured against vertical movement with respect to said head.

21. In a machine for producing a scaled reproduction of a pattern by cuts of uniform depth in elevated and depressed surfaces of work; means for holding the pattern at a normally fixed elevation; means for holding the work in a normally fixed position; a tracer to follow the pattern; a driven rotary cutter spindle the cutter of which is formed to reproduce the pattern on the work; pantograph mechanism operatively connected with the tracer and with said spindle to move the spindle laterally over the work as the tracer follows the pattern; said cutter being relatively floatable to follow the depressions and elevations of the work, and means for determining the cutting depth of the cutter throughout the lateral reproducing movements of the pantograph mechanism and the floating movements of the cutter to reproduce the pattern by cuts of uniform depth in the elevated and depressed work surface.

22. An engraving machine comprising a tracer to follow the pattern to be reproduced in scaled relation in the work, a slide provided with a driven rotary spindle constructed to receive the cutting tool, driving means for said spindle, a pantograph for moving said slide laterally over the work as the tracer follows the pattern, said slide being floatable with respect to said pantograph toward and from the work, and means to require said floating movement of the slide to follow the elevations and depressions of the work surface and produce the scaled reproduction of the pattern by cuts of uniform depth in the work surface.

23. In an engraving machine, in combination, pantograph mechanism, a sleeve forming a slide carried by said mechanism, a rotary cutter spindle formed to carry the cutting tool, said spindle carried by and mounted in said sleeve, and a spindle drive pulley mounted independently of said sleeve and the spindle therein and having loose longitudinally-extensible constant rotary driving connection with said spindle.

24. In an engraving machine, in combination, pantograph mechanism, a hollow sleeve carried thereby laterally over the work and slidable vertically with respect thereto, a rotary cutter tool spindle arranged longitudinally within said sleeve and depending therefrom to receive the cutting tool, bearings in said sleeve for said spindle, the interior of said sleeve forming a chamber in which said bearings are located, lubricant retaining means closing the lower end of said sleeve, said sleeve having an open upper end, an independently supported member normally closing said open upper end and slidably fitting the sleeve, means for driving said spindle, and means for controlling the relative vertical sliding movement of the sleeve.

25. In an engraving machine and the like, in combination, a support, a slide movable with respect thereto, a rotary spindle carried by and mounted in said slide and depending therefrom to receive a cutting tool, a rotary drive for said spindle carried by said support independently of said slide and embodying a spindle driving shaft approximately alined with said spindle and having longitudinally extensible constant rotary driving connection therewith and formed with a hollow end portion longitudinally receiving the upper end of said spindle.

26. In an engraving machine and the like, in combination, pantograph mechanism, a cutting tool slide carried thereby laterally over the work, a member carried by said mechanism, feed mechanism supporting said slide from said member in normal fixed relation and by which said slide is fed vertically with respect to said member and said mechanism, and means for locking said member against vertical movement with respect to said mechanism and whereby said member can be released to permit relative vertical movement and consequent floating of the slide and member with respect to said mechanism.

27. In an engraving machine and the like, in combination, pantograph mechanism, a member carried thereby, and a rotary cutting tool slide carried by said member in normally fixed relation through the medium of feed mechanism, said feed mechanism embodying a nut mounted on said slide, a feed screw extending through said nut and mounted on said member and having operating means, an adjustable sleeve on said nut and a stop on the screw to cooperate with said sleeve in determining the cutting depth.

28. In an engraving machine and the like, in combination, pantograph mechanism, a member carried thereby and freely vertically slidable with respect thereto, a rotary cutting tool spindle and a slide in which the same is mounted carried by said member and movable vertically therewith with respect to said mechanism to permit the cutting tool of said spindle to float with respect to the surface of the work, and a rotary drive for said spindle mounted on said member independently of said spindle and slide.

Signed at Racine, county of Racine, and State of Wisconsin, this 21 day of June, 1924.

GEORGE HORNER.